E. RIMAILHO.
VEHICLE SHOCK ABSORBER.
APPLICATION FILED NOV. 22, 1919.

1,409,781.

Patented Mar. 14, 1922.

INVENTOR
EMILE RIMAILHO,
BY
ATTORNEYS.

UNITED STATES PATENT OFFICE.

EMILE RIMAILHO, OF PARIS, FRANCE, ASSIGNOR TO COMPAGNIE DES FORGES ET ACIERIES DE LA MARINE ET D'HOMECOURT, OF PARIS, FRANCE.

VEHICLE SHOCK ABSORBER.

1,409,781.  Specification of Letters Patent.  Patented Mar. 14, 1922.

Application filed November 22, 1919. Serial No. 339,901.

*To all whom it may concern:*

Be it known that I, EMILE RIMAILHO, a citizen of the French Republic, and residing in Paris, France, 12 Rue de la Rochefoucauld, have invented certain new and useful Improvements in and Relating to Vehicle Shock Absorbers, of which the following is a complete specification.

This invention permits of obtaining the elasticity necessary for deadening the shocks and tremors during the travelling for example of an automobile truck on endless tracks with shoes and thus protect the whole of the mechanisms while ensuring at the same time the correct contact permanently of the rollers with the shoes.

In order to carry out the invention, each roller which revolves freely on an axle, has two essential parts, the hub and the felloe which form two distinct and separate parts. They are connected together by the aid of an elastic contrivance or device such for example as a ring of rubber or other elastic incompressible material suitably forced in between the hub and the felloe. The felloe is provided with internal ledges which prevent all lateral movement outwardly of the elastic device while yet themselves possessing a diametrical play to an appreciable extent relatively to the hub. The results from this arrangement are that on the one hand the volume preserved for the elastic device between the felloe and the hub is invariable, whatever be the eccentricity or obliquity relatively assumed by this part, and on the other hand that when under the effect of a shock, the hub which carries a part of the load, descends towards the ground, and the elastic device or material which is compressed at the lower part of the elastic device, the rubber ring for example, has to flow back upwards rubbing on the side walls of the felloe up to the moment when the cause of the movement having disappeared, the elastic material reacts and assumes its original form and thus brings back the hub to its original position.

In like manner when a shoe of the endless track assumes an oblique transverse position, in consequence for example of the presence of a pebble under one of its edges, the section of the elastic ring will be deformed from right to left or conversely, which allows the felloe to maintain a good contact thus avoiding all chances of derailment of the roller.

The relative independence of the axes of the felloe and of the hub ensures, by this invention, to the mechanism, great smoothness of travelling over different kinds of ground, and owing to the elasticity of the device a good distribution of the total weight of the truck over all the shoes of the endless track bearing on the ground, and finally a guarantee against any derailment and also the disappearance of wear on the shoes in consequence of the complete and normal bearing of the rollers on the race provided by the shoes of the endless track.

In the accompanying drawing which represents by way of example a constructional form of the invention:

Figure 1:
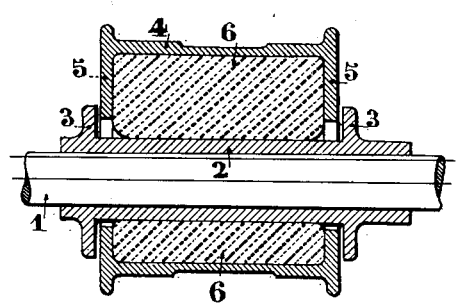
Figure 1 is a vertical section of a roller in its position of vertical deformation.
Figure 2:
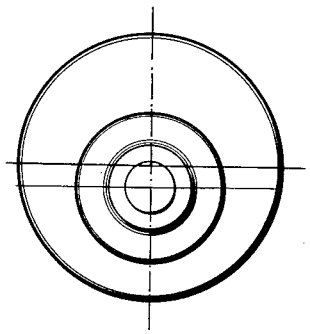
Figure 2 is an end view of Figure 1.
Figure 3:
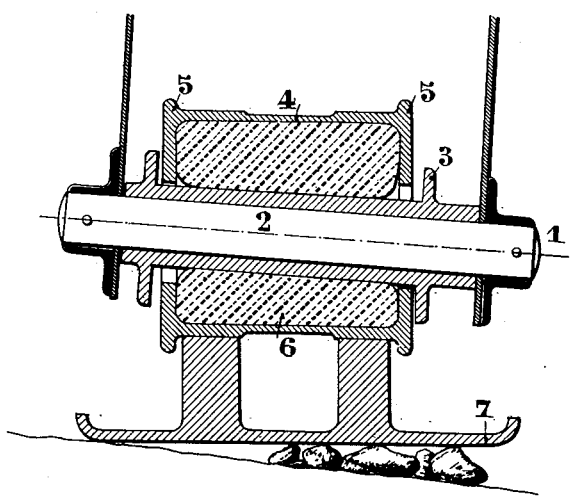
Figure 3 is a vertical section of a roller under oblique deformation.
Figure 4:
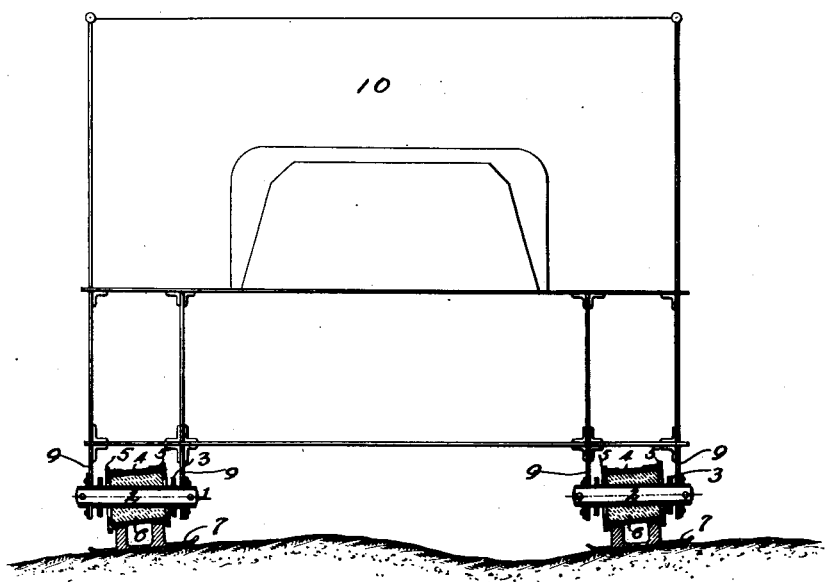
Figure 4 is a sectional view of the improvement showing it applied to a truck frame and in engagement with the endless track shoes; the shoes being in section.

In Figure 1, 1 is the spindle of the roller, 2 is the hub of the roller concentric with the spindle and provided at each end with annular flanges 3; 4 is the felloe of the roller provided laterally with two annular cheeks 5, 5 adapted to fit between the two annular flanges 3, 3 and having a suitable diametrical play. The rollers are mounted in brackets 9 depending from the truck 10 and travel on the endless track shoes 7 as shown in Figures 3 and 4.

It is evident that the elastic device interposed between the hub and the felloe will preferably be a ring of rubber but any other elastic incompressible substance or means may be utilized for the same purpose.

The hub may be constituted by a closed cylinder or be constituted by two half cylinders or may be polygonal at the part in contact with the elastic material. The same applies to the felloe. The surfaces of the hub or of the felloe in contact with the elastic material and the generatrices which are practically parallel with the axis of rotation may be smooth or roughened.

The invention applies in all cases and in all the industries in which a roller has to be applied.

The annular cheeks 5, 5 may be placed outside the annular rings 3, 3.

What I claim is—

1. A roller for automobile trucks having traveling or endless tracks, consisting of a hub having spaced annular flanges, a felloe having annular cheeks fitting between the flanges of the hub and through which the hub loosely passes, and a rubber ring fitting upon the hub and fitting the inner surface of the felloe, said hub being supported on opposite sides of said felloe, whereby said rubber ring permits the felloe to yield angularly between the spaced annular flanges of said hub without moving the latter as said endless tracks move over obstructions.

2. A roller for automobile trucks travelling on endless tracks, consisting of a hub having at its ends annular flanges and a smooth unobstructed surface between the flanges, of uniform diameter throughout its length, a felloe having flat side members provided with circumscribing end flanges adapted to receive the track members therebetween with said roller felloe bearing on said tracks, the side members being centrally apertured and through which the hub loosely extends, with the side members extending between the flanges and overlapping the same, and a rubber ring fitting on the hub and engaging the inner peripheral surface of the hub and the entire surface of the side members, whereby the lateral expansion of the rubber ring is effectually prevented and the deadening effect increased.

3. In a vehicle shock absorber for automobile trucks travelling on endless tracks or shoes, brackets rigid with the vehicle and having a spindle extending between the same, a roller consisting of a hub journaled on said spindle and having at its ends annular flanges spaced from the brackets, a felloe in the form of a cylindrical shell having flat side members disposed at right angles thereto, and provided with circumscribing end flanges adapted to receive the track members therebetween with said felloe bearing on said tracks or shoes, the inner opposing faces of the side members being parallel and said members being provided with central apertures enlarged with respect to the hub and through which the hub loosely extends, with the side members extending between the flanges and overlapping the same, and an elastic incompressible material filling the space between the hub and the inner surface of the felloe and side members thereof, substantially in the manner and for the purpose set forth.

4. The combination with an endless track-shoe vehicle having a body and brackets depending from said body and rigidly attached to the vehicle; of spindles mounted in the brackets, and a roller on each spindle adapted to engage and bear on the shoes of the vehicle, each roller comprising a hub provided with two annular flanges integral therewith adjacent to its ends, a felloe in the form of a cylindrical shell having two lateral annular cheeks axially apertured for diametrical play on the hub and fitting between the two flanges of the hub, said felloe having side flanges extending outwardly and circumscribing the same between which the shoes engage, and an incompressible rubber ring interposed between the hub and felloe so that the outer and inner surfaces of the ring are in intimate contact respectively with the interior of the felloe and the exterior of the hub to permit any deformation, vertical or oblique, in order to insure the correct contact permanently of the felloe with the shoes of the endless track and to absorb by deformation the shocks and tremors during the travelling of the vehicle.

In testimony whereof I have hereunto set my hand at Paris, France, this 24th day of October, 1919.

EMILE RIMAILHO.

In the presence of—
CHAS. P. PRESSLEY.